(12) United States Patent
Inaba et al.

(10) Patent No.: US 8,525,629 B2
(45) Date of Patent: Sep. 3, 2013

(54) REACTOR

(75) Inventors: Kazuhiro Inaba, Osaka (JP); Yasushi Nomura, Osaka (JP); Shinichiro Yamamoto, Osaka (JP); Yukinori Yamada, Osaka (JP); Miki Kitajima, Osaka (JP); Kenji Kitajima, Osaka (JP)

(73) Assignee: Sumitomo Electric Industries, Ltd., Osaka-Shi (JP)

( * ) Notice: Subject to any disclaimer, the term of this patent is extended or adjusted under 35 U.S.C. 154(b) by 0 days.

(21) Appl. No.: 13/522,175

(22) PCT Filed: Jan. 8, 2011

(86) PCT No.: PCT/JP2011/050230
§ 371 (c)(1),
(2), (4) Date: Jan. 8, 2011

(87) PCT Pub. No.: WO2011/089941
PCT Pub. Date: Jul. 28, 2011

(65) Prior Publication Data
US 2012/0299678 A1    Nov. 29, 2012

(30) Foreign Application Priority Data
Jan. 20, 2010  (JP) ................ 2010-009690

(51) Int. Cl.
*H01F 27/08* (2006.01)
(52) U.S. Cl.
USPC ........................................... 336/55

(58) Field of Classification Search
USPC ......... 336/65, 83, 192, 196, 200, 232, 55–62, 336/90, 96
See application file for complete search history.

(56) References Cited

U.S. PATENT DOCUMENTS

| | | | | |
|---|---|---|---|---|
| 3,617,966 A | * | 11/1971 | Trench et al. | 336/61 |
| 3,883,834 A | * | 5/1975 | Osteen | 336/61 |
| 6,492,890 B1 | * | 12/2002 | Woznlczka | 336/61 |
| 2009/0045898 A1 | * | 2/2009 | MacLennan | 336/67 |

FOREIGN PATENT DOCUMENTS

| | | |
|---|---|---|
| JP | 2003-197444 A | 7/2003 |
| JP | 2007-335833 A | 12/2007 |
| JP | 2008-042094 A | 2/2008 |
| JP | 2008-166503 A | 7/2008 |
| JP | 2009-033051 A | 2/2009 |

* cited by examiner

*Primary Examiner* — Tuyen Nguyen
(74) *Attorney, Agent, or Firm* — Venable LLP; Michael A. Sartori; Tamatane J. Aga

(57) ABSTRACT

Provided is a reactor including a coil, and a core having an inner core portion arranged inside the coil and an outer core portion covering the outside of the coil. The inner core portion of the reactor has a higher saturation magnetic flux density than that of the outer core portion. The outer core portion has a lower permeability than that of the inner core portion, and is made of a mixture of a magnetic material and a resin. The case has a heat-transfer portion at an inner wall surface, as a heat-radiation structure for at least one of the coil and the inner core portion. With the reactor, even if the outside of the coil is covered with a core member, heat generated in the reactor can be effectively dissipated.

5 Claims, 9 Drawing Sheets

REACTOR

TECHNICAL FIELD

The present invention relates to a reactor used for a component of a power converter such as a vehicle-mounted direct current-direct current (DC-DC) converter.

BACKGROUND ART

A hybrid electric vehicle, a plug-in hybrid electric vehicle, an electric vehicle, and the like, each need a converter that performs a step-up operation and a step-down operation when a travel motor is driven or a battery is charged. Even for a fuel cell vehicle, the output of a fuel cell is stepped up. One of parts of the converter is a reactor. For example, a reactor has a form in which a pair of coils each having an O-shaped magnetic core and a wire wound on the outer periphery of the magnetic core are arranged in parallel.

PTL 1 discloses a reactor including a magnetic coil having an E-shaped cross section, the magnetic coil which is so-called a pot core. The magnetic core includes a columnar inner core portion inserted into a single coil, a cylindrical outer core portion arranged to cover the outer periphery of the coil, and a pair of disk-like coupling core portions arranged at both end surfaces of the coil. The coupling core portions couple the concentrically arranged inner and outer core portions with each other and hence the pot core forms a closed magnetic circuit.

CITATION LIST

Patent Literature
 PTL 1: Japanese Unexamined Patent Application Publication No. 2009-033051

SUMMARY OF INVENTION

Technical Problem

In the reactor of PTL 1, the inner core portion and the coil are covered with the outer core portion and the coupling core portions. Such a structure hardly dissipates heat that is generated in the reactor due to a copper loss or an iron loss. Particularly in the vehicle-mounted converter, current with several hundreds of amperes may flow through the reactor. The amount of heat generated by the coil may increase, and hence the internal temperature of the reactor may rise to high temperatures of 100° C. or higher.

To address such a problem, the present invention provides a reactor that can effectively dissipate heat generated in a reactor even if the outside of a coil is covered with a core member.

Solution to Problem

A reactor provided by the present invention includes a coil; a core having an inner core portion arranged inside the coil and an outer core portion covering the outside of the coil; and a case housing the coil and the core. The case has a heat-radiation structure at an inner wall surface, the heat-radiation structure being provided for at least one of the coil and the inner core portion. The outer core portion has a shape corresponding to the heat-radiation structure.

With this reactor, the heat-radiation structure for the at least one of the coil and the inner core portion is provided at the inner wall surface of the case. Accordingly, even if the outside of the coil is covered with a core member, the heat-radiation structure in the case can increase heat-radiation performance of the at least one of the coil and the inner core portion.

In this reactor, the heat-radiation structure may have a heat-transfer portion provided such that part of the inner wall surface of the case protrudes. Since the part of the inner wall surface of the case protrudes, the at least one of the coil and the inner core portion can be further close to the inner wall surface. Accordingly, the heat-radiation performance of the at least one of the coil and the inner core portion can be increased.

The heat-radiation structure may be non-similar to an outer wall surface of the case, and may be formed of the inner wall surface that is formed to correspond to an external shape of the at least one of the coil and the inner core portion. Since the inner wall surface is formed to correspond to the external shape of the at least one of the coil and the inner core portion, the distance between the at least one of the coil and the inner core portion and the inner wall surface can be decreased equivalently at respective portions. Hence the heat-radiation performance of the at least one of the coil and the inner core portion can be increased.

According to an aspect of the reactor, at least the outer core portion of the core is formed of a mixture of a magnetic material and a resin. Accordingly, even if the heat-radiation structure has a complicated shape, the outer core portion can be easily formed.

Also, according to an aspect of the reactor, the coil is arranged such that an axial direction of the coil is in substantially parallel to a bottom surface of the case. Accordingly, the heat can be dissipated to the bottom surface of the case, the bottom surface which is being cooled.

Advantageous Effects of Invention

With the present invention, even if the outside of the coil is covered with the core member as described above, the heat-radiation performance of the at least one of the coil and the inner core portion can be increased.

BRIEF DESCRIPTION OF DRAWINGS

The above-described object and other objects, features, and advantages are described according to the following embodiment provided below with reference to the accompanying figures. In the figures, the same reference sign represents the same part even in different figures.

FIG. 5A is a side view when the reactor is cut along a side wall 212 at a position directly inside the side wall 212.

FIG. 5B is a plan view when the reactor is cut along an end-surface direction of the coil.

FIG. 7A is a side view when the reactor is cut along the side wall 212 at a position directly inside the side wall 212.

FIG. 7B is a plan view when the reactor is cut along the end-surface direction of the coil.

FIG. 8A is a side view when the reactor is cut along the side wall 212 at a position directly inside the side wall 212.

FIG. 8B is a plan view when the reactor is cut along the end-surface direction of the coil.

FIG. 9A is a plan view when the reactor is cut along the end-surface direction of the coil.

FIG. 9B is a plan view when viewed from above.

FIG. 10A is a side view when the reactor is cut along the side wall 212 at a position directly inside the side wall 212.

FIG. 10B is a plan view when the reactor is cut along the end-surface direction of the coil.

DESCRIPTION OF EMBODIMENTS

Figure 1:
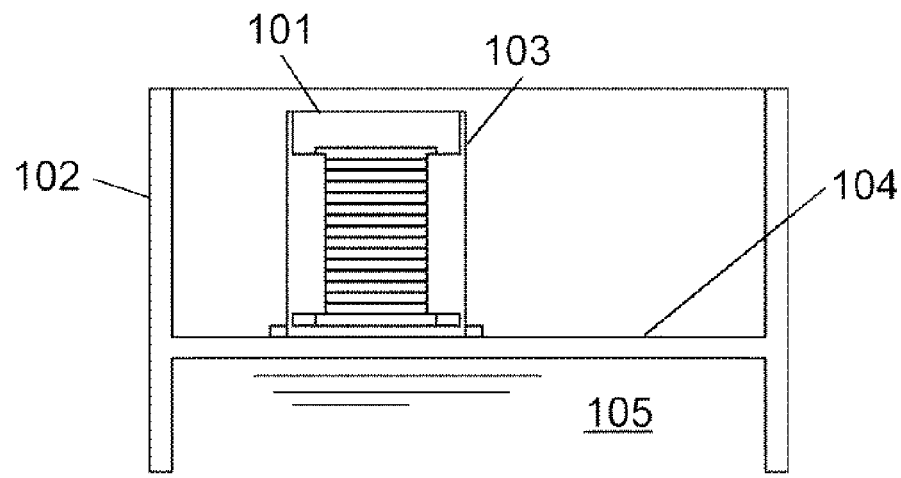
FIG. 1 is an illustration showing an installation state of a reactor according to an embodiment of the present invention.

The present invention is described in more detail below. FIG. 1 is an illustration showing an installation state of a reactor according to an embodiment of the present invention. A reactor 101 according to the embodiment can be used for a part of a vehicle-mounted DC-DC converter. The reactor 101 is housed in a converter case 102 made of aluminum together with other parts. In this embodiment, the reactor 101 includes a case 103 made of aluminum and having, for example, a box-lid-like shape. The reactor 101 is arranged in the converter case 102 such that the case 103 is fixed to an inner bottom surface 104 of the converter case 102 by a bolt. A bottom surface of the case 103 is in surface-contact with the inner bottom surface 104 of the converter case 102.

In the vehicle-mounted converter, current with several hundreds of amperes may be applied to the reactor 101, resulting in that the reactor 101 generates heat at high temperatures. In order to cool the reactor 101 and other parts, cooling water 105 is introduced to an outer bottom surface of the converter case 102. The heat generated by the reactor 101 is transferred to the converter case 102 through the bottom surface of the case 103 and is dissipated by the cooling water 105.

Figure 2:
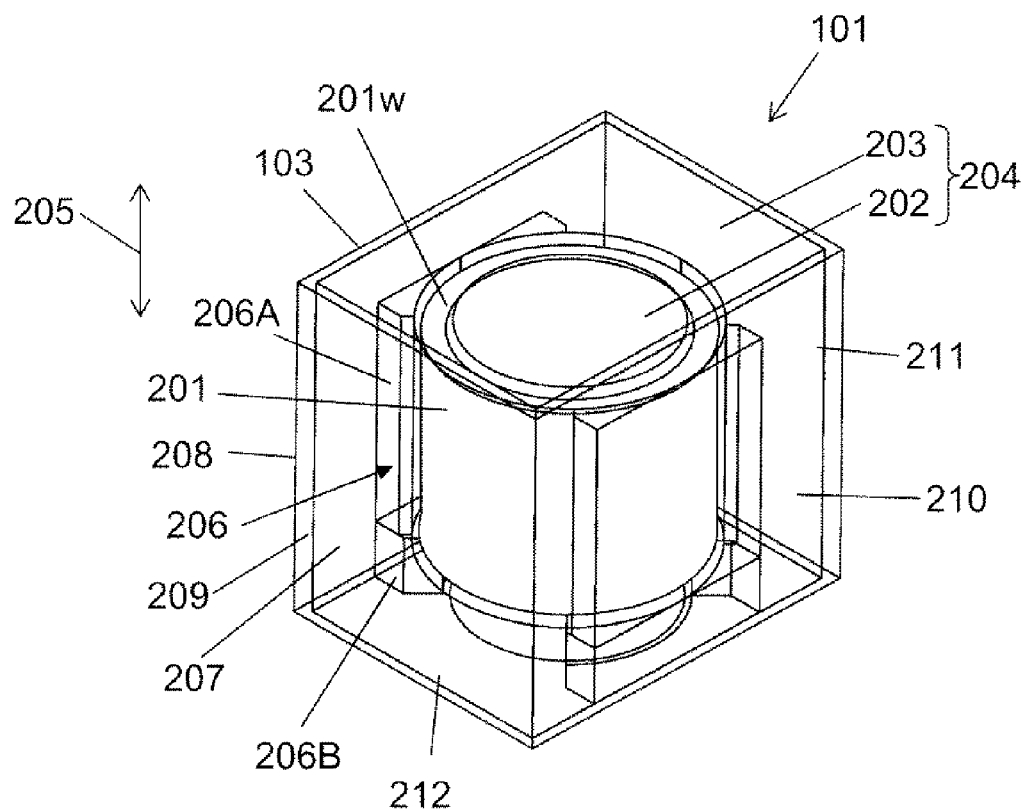
FIG. 2 is a perspective view showing the brief configuration of the reactor according to the embodiment of the present invention.

FIG. 2 is a perspective view showing the brief configuration of the reactor according to the embodiment. The reactor 101 includes a coil 201 and a core 204. The core 204 includes an inner core portion 202 arranged inside the coil 201, and an outer core portion 203 covering the outside of the coil 201. The case 103 included in the reactor 101 houses the coil 201 and the core 204.

In this reactor 101, the coil 201 is formed by winding a single continuous wire 201w in a spiral form, and has an axial direction 205 arranged in parallel to the normal direction of the bottom surface of the case 103. Both ends of the wire 201w are connected with a semiconductor element and a battery of the converter. The wire 201w preferably uses a coated wire having an insulating coating made of an insulating material on the outer periphery of a conductor made of a conducting material such as copper or aluminum. The conductor is formed of a rectangular wire made of copper. The wire 201w uses a coated rectangular wire with an insulating coating of enamel. The cross section of the conductor of the wire 201w may not be the rectangular cross section, and may be any of various cross sections, such as a circular cross section, and a polygonal cross section.

The reactor having the above-described configuration can be preferably used for a particular purpose of use under electricity-application conditions in which a maximum current (direct current) is in a range from about 100 to 1000 A, an average voltage is in a range from about 100 to 1000 V, and a usable frequency is in a range from about 5 to 100 kHz, or typically, the reactor can be preferably used as a component of a vehicle-mounted power converter in a vehicle such as an electric vehicle, a hybrid electric vehicle, etc. With the particular purpose of use, it is expected that a preferably used configuration satisfies conditions in which an inductance when applied direct current is 0 A is in a range from 10 μH to 2 mH and an inductance when applied current is a maximum application current is 10% or more of the inductance when applied current is 0 A. When the reactor is a vehicle-mounted part, the reactor containing the case preferably has a capacity in a range from about 0.2 litters (200 cm$^3$) to about 0.8 litters (800 cm$^3$).

The coil 201 forms a single coil element. Alternatively, a single wire may form a plurality of coil elements and these coil elements may be housed in a case. The plurality of coil elements do not have to be formed of a single wire, and may be formed of separate wires. The wires may form an integrated coil by bonding ends of the wires by welding or the like. For welding the separate wires, for example, tungsten inert gas (TIG) welding, laser welding, or resistance welding may be used. Alternatively, the ends of the wires may be bonded by contact bonding, cold pressure welding, or vibration welding.

Both ends of the wire 201w forming the coil 201 are led from turns by a certain amount to the outside of the outer core portion 203. The insulating coating is removed and the conductor portions are exposed. Terminal members made of a conductive material such as copper or aluminum are connected with the exposed conductor portions. The coil 201 is connected with a battery etc. through the terminal members. The connection between both ends of the wire 201w and the terminal members can use welding such as TIG welding or contact bonding etc.

The core 204 forms a closed magnetic circuit because the inner core portion 202 and the outer core portion 203 are integrated. In this embodiment, the inner core portion 202 and the outer core portion 203 are formed of different forming materials, and hence have different magnetic properties. To be more specific, the inner core portion 202 has a higher saturation magnetic flux density than that of the outer core portion 203, and the outer core portion 203 has a lower permeability than that of the inner core portion 202.

The inner core portion 202 has an external shape extending along the shape of the inner peripheral surface of the coil 201 (if a plurality of coil elements are formed, these coil elements). In this case, the inner core portion 202 has a columnar external shape. Alternatively, the inner core portion 202 may have an external shape like a rectangular-parallelepiped with an end-surface shape being a rectangular with rounded corners (a track-like shape), or other external shape. The inner core portion 202 may be entirely formed of a powder compact, and may have a configuration in which a gap member, an air gap, or a bonding member is not interposed. Alternatively, the inner core portion 202 may be formed of a plurality of cores with a gap member, an air gap, or a bonding member interposed therebetween.

The powder compact is typically obtained by molding a soft magnetic powder having an insulating coating on the surface thereof, and burning the soft magnetic powder at a heat-resistant temperature or lower of the insulating coating. A mixed powder in which a binder is appropriately mixed to the soft magnetic powder may be used, or a powder having a coating made of silicone resin as an insulating coating may be used. The saturation magnetic flux density of the powder compact can be changed depending on the material of the soft magnetic powder, and by adjusting the mixing ratio of the soft magnetic powder and the binder, and the amounts of various coatings. For example, by using a soft magnetic powder with a high saturation magnetic flux density, or by decreasing the contained amount of the binder and increasing the ratio of the soft magnetic material, a powder compact with a high saturation magnetic flux density is obtained. The saturation magnetic flux density may be increased even by changing a molding pressure, more particularly, by increasing the molding pressure. The soft magnetic powder may be selected and the molding pressure may be adjusted to obtain a desirable saturation magnetic flux density.

The soft magnetic powder may be an iron-family metal powder, such as iron (Fe), cobalt (Co), or nickel (Ni); a Fe base alloy powder, such as Fe-silicon (Si), Fe—Ni, Fe-aluminum (Al), Fe—Co, Fe-chromium (Cr), Fe—Si—Al; or alternatively, a rare earth metal powder or a ferrite powder. In particular, the Fe base metal powder likely provides a powder compact with a high saturation magnetic flux density. Such a powder can be produced by atomizing (with gas or water), mechanical pulverizing, or other method. If a powder formed of a nanocrystal material having a nanosized crystal, or more preferably, a powder formed of an anisotropic nanocrystal material is used, a powder compact which is highly anisotropic and has a low coercive force is obtained. The insulating coating formed on the soft magnetic powder uses, for example, a phosphate compound, a silicon compound, a zirconium compound, or a boron compound. The binder may use a thermoplastic resin, a non-thermoplastic resin, or a higher fatty acid. The binder is lost or changed to an insulator such as silica by burning. Since the powder compact has an insulator such as the insulating coating, the soft magnetic powder is insulated from other soft magnetic powder, and hence an eddy current loss can be reduced. Even if power with a high frequency is applied to the coil, the loss can be reduced.

The inner core portion 202 contains a configuration that is entirely arranged inside the coil (element), and also a configuration that partly protrudes from the coil (element). In an example shown in FIG. 2, the inner core portion 202 has a larger length in the axial direction of the coil 201 than the length of the coil 201. Both ends of the inner core portion 202 protrude from end surfaces of the coil 201. The length of the inner core portion 202 may be equivalent to or slightly smaller than the length of the coil 201. If the length of the inner core portion 202 is equivalent to or larger than the length of the coil 201, the magnetic flux generated by the coil 201 can sufficiently pass through the inner core portion 202.

In this embodiment, the outer core portion 203 is formed to cover substantially entirely the coil 201 and the inner core portion 202. In other words, the outer core portion 203 substantially covers the entire outer periphery of the coil 201, both end surfaces of the coil 201, and both end surfaces of the inner core portion 202. The inner core portion 202 and the outer core portion 203 are bonded together by the resin forming the outer core portion 203 without an adhesive member interposed therebetween. By such bonding, the core 204 can be entirely integrated without a gap.

The outer core portion 203 has an external shape of a rectangular-parallelepiped corresponding to the inner wall surface of the case as a basic external shape. However, the shape of the outer core portion 203 is not particularly limited as long as a closed magnetic circuit can be formed. The outer side of the coil 201 may not be partly covered with the outer core portion 203 and may be exposed.

The outer core portion 203 can be entirely formed of a mixture (hardened compact) of a magnetic material and a resin. The hardened compact can be typically formed by injection molding or cast molding. The injection molding normally mixes a soft magnetic powder (or a mixed powder to which a non-magnetic powder is further added if required) and a binder resin having fluidity, molds the mixed fluid into a mold with a predetermined pressure, and then hardens the binder resin. The cast molding obtains the mixed fluid like the injection molding, and then injects the mixed fluid into a mold to mold and harden the mixed fluid without application of a pressure. In either of the molding methods, the binder resin can preferably use a thermosetting resin, such as epoxy resin, phenol resin, or silicone resin. If the binder resin uses the thermosetting resin, the compact is heated and hence the resin is thermally hardened. The binder resin may alternatively use a room-temperature-setting resin or a low-temperature-setting resin. In this case, the resin is left at a temperature in a range from a room temperature to a relatively low temperature to harden the resin. The binder resin, which is a non-magnetic material, remains in the hardened compact by a large amount. Even if the hardened compact uses the same soft magnetic powder as that of the powder compact, the hardened compact has a lower saturation magnetic flux density and a lower permeability than those of the powder compact.

In the case in which the injection molding or cast molding is used, the permeability of the outer core portion can be adjusted by changing the contained amounts of the soft magnetic powder (or non-magnetic powder) and the binder resin if sintering is not performed, or by changing the contained amounts of the soft magnetic powder and the non-magnetic powder if sintering is performed. For example, if the contained amount of the soft magnetic powder decreases, the permeability tends to decrease. The permeability of the outer core portion 203 is preferably adjusted so that the reactor 101 has a desirable inductance.

The soft magnetic powder for the outer core portion 203 can use a powder equivalent to the soft magnetic powder for the above-described inner core portion 202.

An insulator is preferably arranged at a position at which the core 204 is in contact with the coil 201 in order to further increase insulation between both the parts. For example, an insulating tape may be attached to the inner and outer peripheral surfaces of the coil 201, or insulating paper or an insulating sheet may be arranged. A bobbin made of an insulating material may be arranged on the outer periphery of the inner core portion 202. The forming material of the bobbin can preferably use an insulating resin, such as polyphenylene sulfide (PPS) resin, liquid crystal polymer (LCP), or polytetrafluoroethylene (PTFE) resin.

With this reactor 101, since the saturation magnetic flux density of the inner core portion 202 is higher than that of the outer core portion 203, if the total magnetic flux passing through the inner core portion 202 is equivalent to the total magnetic flux passing through an inner core of a magnetic core (a uniform core) having a shape similar to the shape of the core of the reactor 101 and entirely having a uniform saturation magnetic flux density, the cross-sectional area of the inner core portion 202 (a plane through which the magnetic flux passes) can be smaller than the cross-sectional area of the inner core of the uniform core. Since the inner core portion 202 is downsized, the core 204 can be downsized, and as the result, the reactor 101 can be downsized. Also, with the reactor 101, since the inner core portion 202 has the high saturation magnetic flux density and the outer core portion 203 has the low permeability, the reactor 101 can have a desirable inductance. Further, with the reactor 101, in a case in which a gap containing an adhesive is not present entirely in the core 204, a phenomenon in which a magnetic flux leaking at the gap affects the coil 201 does not occur. Hence, the inner core portion 202 can be arranged closely to the inner peripheral surface of the coil 201. Accordingly, the gap between the outer peripheral surface of the inner core portion 202 and the inner peripheral surface of the coil 201 can be decreased. Also in this point of view, the reactor 101 can be downsized.

In addition, if the reactor 101 does not use an adhesive, a bonding process for a gap member is not required when the inner core portion 202 is formed, resulting in good productivity. In particular, with the reactor 101, the inner core portion 202 and the outer core portion 203 are bonded together by the forming resin of the outer core portion 203 to form the core 204 simultaneously when the outer core portion 203 is formed, and as the result, the reactor 101 can be manufactured. Accordingly, the manufacturing process is simplified, and also in this point of view, the productivity is increased.

Also, if the reactor 101 has a structure without an adhesive, a phenomenon in which mismatching appears in inductance due to variation of the thickness of the adhesive hardly occurs.

Further, with the reactor 101, since the inner core portion 202 is the powder compact, the saturation magnetic flux density can be easily adjusted, and even if the inner core portion 202 has a complicated three-dimensional shape, the inner core portion 202 can be easily formed. In addition, since the outer core portion 203 has a resin component, the outer core portion 203 can be protected from the external environment, such as dust and corrosion, and can be mechanically protected.

In particular, with the reactor 101, since the coil 201 is entirely covered with the outer core portion 203, the outer core portion 203 can be easily formed and can sufficiently protect the coil 201. As described above, the reactor 101 have various advantages.

Further, with the reactor 101, although the coil 201 is entirely covered with the outer core portion 203, the internal temperature can be maintained low. As described with reference to FIG. 1, the bottom surface of the reactor 101 is cooled, and hence the internal temperature at the bottom surface side is relatively likely decreased. In contrast, the upper surface side of the reactor 101 is the farthest from the bottom surface of the case 103, and is not covered with the case unlike the bottom surface and the side surfaces of the reactor 101. The heat is mainly dissipated through a path extending from the inner core portion 202 to the bottom surface and a path extending to the bottom surface through the outer core portion 203 and the side walls of the case. The temperature is relatively likely increased. In particular, if the outer core portion 203 is molded of a mixture of a magnetic material and a resin, the outer core portion 203 has a lower thermal conductivity than that of the inner core portion 202. The tendency in which the temperature is relatively likely increased is promoted.

To reduce a rise in internal temperature, in the reactor 101 according to this embodiment, the case 103 includes a heat-transfer portion 206 at an inner wall surface 207, as a heat radiating structure for at least one of the coil 201 and the inner core portion 202. The heat-transfer portion 206 is formed such that part of the inner wall surface 207 of the case 103 protrudes, and forms part or entirety of the inner wall surface 207 that is non-similar to an outer wall surface 208. Since the heat-transfer portion 206 is provided, the outer core portion 203 is formed to correspond to the shape of the heat-transfer portion 206, and hence the at least one of the coil 201 and the inner core portion 202 is close to the inner wall surface 207 as compared with a case in which the inner wall surface 207 is similar to the outer wall surface 208. Accordingly, the heat-radiation performance of the at least one of the coil 201 and the inner core portion 202 can be increased.

The heat-transfer portion 206 is provided at each of side walls 209 and 210 from among side walls 209 to 212 of the case 103, and forms part of the inner wall surfaces of these side walls. The basic shape of the inner wall surface 207 is a rectangular-parallelepiped that is similar to the outer wall surface 208. However, since the heat-transfer portion 206 that protrudes from the base surface toward the coil 201 and the inner core portion 202 is provided, the inner wall surface 207 is non-similar to the outer wall surface 208. With the protrusion, (the heat-transfer portion 206 of) the inner wall surface 207 is in contact with the coil 201 and the inner core portion 202.

The heat-transfer portion 206 is not limited to a configuration that is integrally molded with the case 103 as part of the case 103, and includes a configuration that is formed of a material which is the same as or different from the material of the body of the case 103, that is formed separately from the body, and that is fixed to the body.

The material of the heat-transfer portion 206 may use a metal material such as aluminum or an aluminum alloy, or a ceramic such as silicon nitride, alumina, aluminum nitride, boron nitride, or silicon carbide. Since the heat-transfer portion 206 with a high thermal conductivity is in contact with (or is close to) the coil 201 and the inner core portion 202 (substantially) not through the outer core portion 203, the heat in the reactor 101 is effectively dissipated. It is to be noted that if the heat-transfer portion 206 is also used as a rib, the material of the heat-transfer portion 206 has to be selected by also taking into account the mechanical strength.

When the reactor 101 is manufactured, for example, the coil 201 and the inner core portion 202 formed of the powder compact are prepared, and the inner core portion 202 is inserted into the coil 201. At this time, an insulator may be appropriately arranged between the coil 201 and the inner core portion 202. This assembled part of the coil 201 and the inner core portion 202 is housed in the case 103 provided with the heat-transfer portion 206.

In this state, the mixed fluid of the magnetic material and the binder resin forming the outer core portion 203 is properly applied into the case 103. In this way, since the outer core portion 203 is formed by filling the mixture of the magnetic material and the resin, even if the inner wall surface 207 of the case 103 has a complicated shape for the heat-radiation structure, the outer core portion 203 can be formed to correspond to the heat-radiation structure, and thus the reactor 101 can be relatively easily manufactured.

The heat-transfer portion 206 is not provided at the side wall 211 or 212 of the case 103 in this example. Owing to this, in the vicinity of the side walls 211 and 212, the outer core portion 203 is continuously formed in the axial direction of the coil 201 so as to connect one end and the other end of the inner core portion 202. In this portion, a ring-shaped (closed) magnetic circuit extending along the inner core portion 202 and the outer core portion 203, from the inside, to the outside, and then to the inside of the coil 201, is widely ensured. As the result, a desirable magnetic characteristic can be provided although the heat-transfer portion 206 is provided at the inner wall surface 207 of the case 103. The inner wall provided with the heat-transfer portion 206 is not limited to this example, and the inner wall can be properly determined as long as the magnetic circuit can be ensured.

The heat-transfer portion 206 includes a protrusion 206A protruding from the inner wall surface 207 of the case 103 so as to be in contact with the outer peripheral surface of the coil 201, and a protrusion 206B protruding from the inner wall surface 207 of the case 103 so as to be in contact with the inner core portion 202 protruding from the end surface of the coil 201. The protrusion 206A has a concave surface corresponding to the outer peripheral surface of the coil 201 as a contact surface, and the protrusion 206B has a concave surface corresponding to the outer peripheral surface of the inner core portion 202 as a contact surface. With these concave surfaces, the contact (or close) area is larger than that in a case in which these surfaces are flat. The heat can be likely dissipated from the coil 201 and the inner core portion 202 by that amount.

Figure 3:
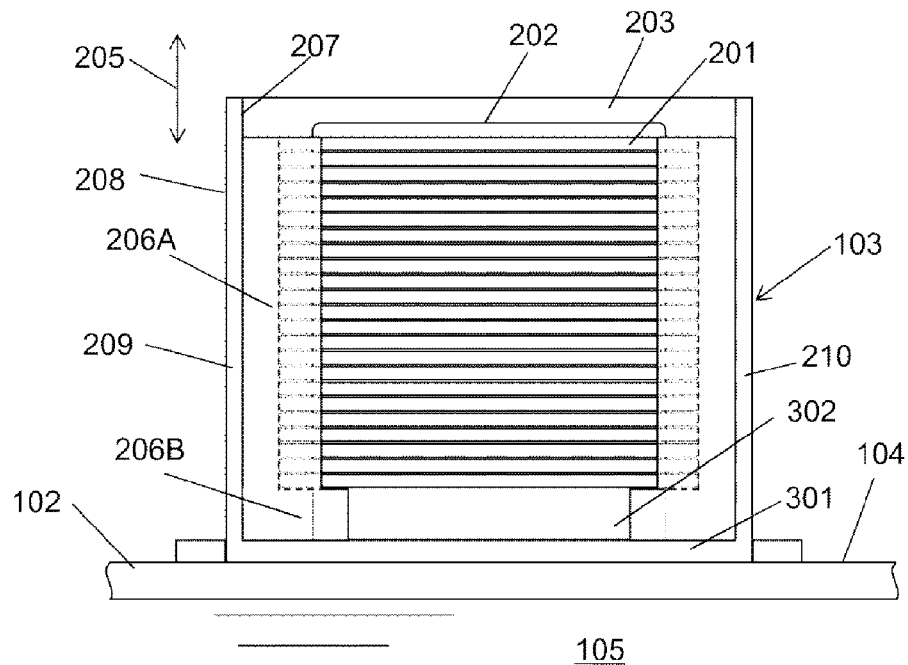
FIG. 3 is a cross-sectional view of the reactor for explaining the configuration of a heat-transfer portion.

FIG. 3 is a cross-sectional view of the reactor for explaining the configuration of the heat-transfer portion. In the heat-transfer portion 206, the protrusion 206A is continued to the protrusion 206B in the axial direction 205 of the coil 201. Further, the protrusion 206B is provided at each of the side walls 209 and 210 of the case 103 and is continued to a bottom surface 301 of the case 103. The heat from the coil 201 is transferred to the bottom surface 301 of the case 103 through the protrusions 206A and 206B. Hence, the heat can be likely dissipated from the coil 201 as compared with a case in which only the protrusion 206A is provided. Also, since the protrusion 206B is continued to the bottom surface 301 of the case 103, the heat from the inner core portion 202 can be also likely transferred to the bottom surface 301. In addition, an upper end surface of the protrusion 206B is in contact with part of a lower end surface of the coil 201. Hence, the protrusion 206B can make a contribution to cooling the coil 201.

Further, in the reactor 101, a lower end portion 302 of the inner core portion 202 is in surface-contact with the bottom surface 301 of the case 103. The inner core portion 202 has a higher thermal conductivity than that of the outer core portion 203. Since the lower end surface of the inner core portion 203 is in contact with the bottom surface 301, the heat can be dissipated to the case 103 even through the inner core portion 203. The heat-radiation performance of the entire reactor 101 can be further increased.

In this case, the heat-transfer portion 206 includes the protrusions 206A and 206B. However, the heat-transfer portion 206 may include only one of the protrusions 206A and 206B. Further, a heat-transfer portion (or a protrusion) like the protrusion 206B may be provide at an upper end side of the coil 201. The upper surface side of the reactor 101 is not covered with the case 103. In particular, a center portion is far from the side walls 209 to 212 of the case 103, and hence the temperature of the center portion likely rises. If the heat-transfer portion is provided at the upper end side of the coil 201, the heat at the upper surface side of the reactor 101 can be effectively dissipated. Also, the protrusions 206A and 206B are close to the coil 201 and the inner core portion 202 by way of employing the concave surfaces; however, the protrusions 206A and 206B may be close to the coil 201 and the inner core portion 202 by way of employing flat surfaces or convex surfaces. Since the coil 201 has the cylindrical shape, the inner core portion 202 has the columnar shape, and the inner wall surface of the case 103 has the shape of a rectangular-parallelepiped, if a flat surface or a convex surface is employed, part of the heat-transfer portion becomes close to the coil 201 or the inner core portion 202 as compared with the other part. However, the close part protrudes from the base surface of the inner wall, and hence the heat can be likely dissipated from the coil 201 or the inner core portion 202 by that amount.

Figure 4:
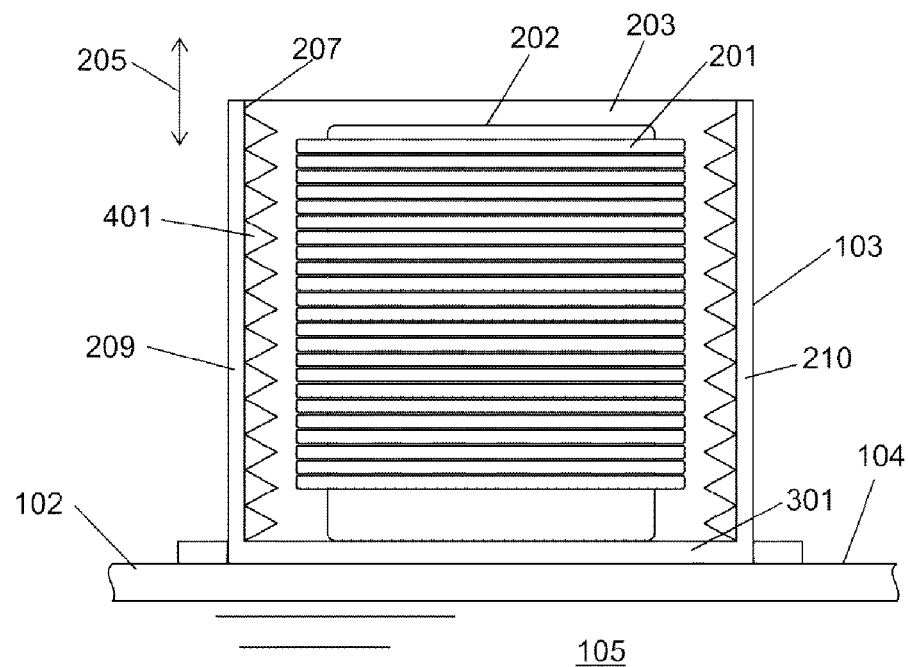
FIG. 4 is a cross-sectional view explaining a reactor including fin-like heat-transfer portions, as a heat-transfer portion according to another example.

FIG. 4 is a cross-sectional view explaining a reactor including fin-like heat-transfer portions, as a heat-transfer portion according to another example. A heat-transfer portion 401 is provided at each of the side walls 209 and 210 of the case 103 like the example shown in FIG. 3. The heat-transfer portion 401 includes a plurality of fin-like protrusions. For example, a plurality of plate pieces each having a triangular cross section and are arranged in the axial direction 205 of the coil 201. Each piece is arranged on the side wall 209 or 210 in parallel to the bottom surface 301 of the case 103. The heat-transfer portion 401 may be alternatively formed in other manner, for example, by arranging a plurality of needle-like protrusions on the side wall 209 and 210. The heat-transfer portions 401 is not in contact with the coil 201 or the inner core portion 202; however, may be in contact with the coil 201 and the inner core portion 202. If the heat-transfer portions 401 is not in contact with the coil 201 or the inner core portion 202, the outer core portion 203 is formed at that portion to ensure the magnetic circuit.

Even if the heat-transfer portions 401 is not in contact with the coil 201 or the inner core portion 202, the inner wall surfaces of the side walls 209 and 210 are close to the coil 201 and the inner core portion 202 because of the presence of the heat-transfer portions 401 with reference to the base surfaces. Accordingly, the heat is likely dissipated from the coil 201 and the inner core portion 202 to the case 103. Also, since the heat-transfer portions 401 are provided, the surface area of the inner wall surfaces of the side walls 209 and 210 becomes large, and hence the heat is likely dissipated also in this point of view.

Figure 5A:
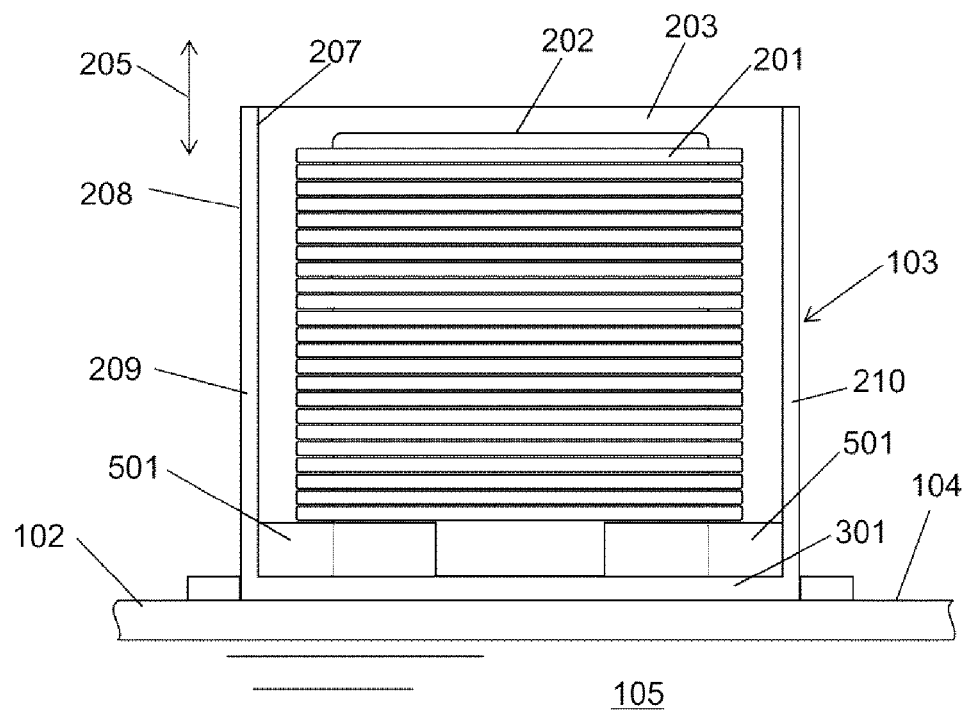
FIG. 5A is an illustration explaining a reactor including rectangular-plate-like heat-transfer portions at four inner corners of a case, as a heat-transfer portion according to still another example. More particularly.
Figure 5B:
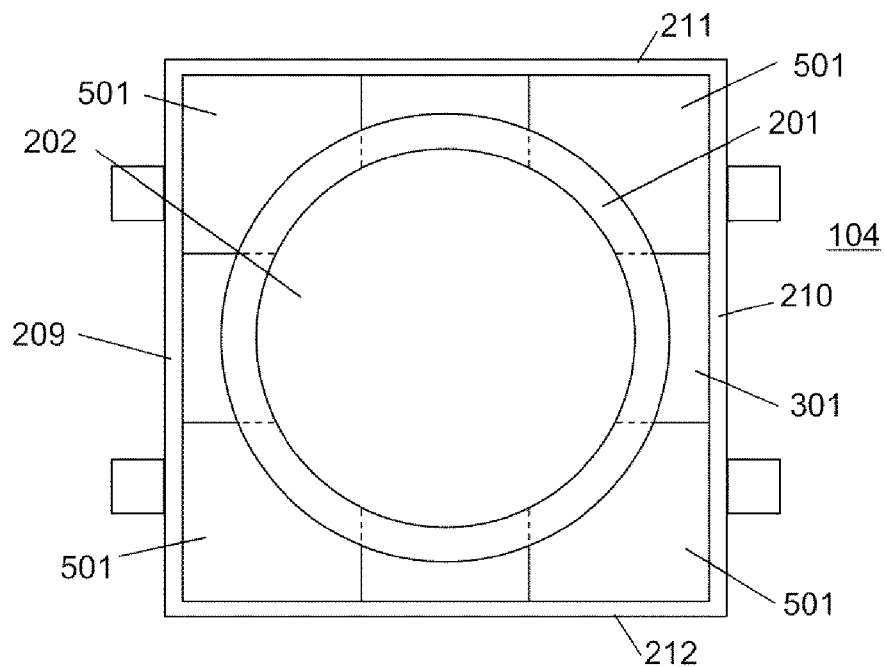
FIG. 5B is an illustration explaining the reactor including the rectangular-plate-like heat-transfer portions at the four inner corners of the case, as the heat-transfer portion according to still another example. More particularly.

FIGS. 5A and 5B are illustrations explaining a reactor including rectangular-plate-like heat-transfer portions at four inner corners of the case, as a heat-transfer portion according to still another example. FIG. 5A is a side view when the reactor is cut along the side wall 212 at a position directly inside the side wall 212. FIG. 5B is a plan view when the reactor is cut along the end-surface direction of the coil. Heat-transfer portions 501 are provided at positions corresponding to the four inner corners of the box-like case 103. If the case has a box-like shape and the coil 201 has a cylindrical shape, the distance between the coil 201 and the side walls 209 to 212 of the case 103 becomes large particularly at the four corners. By providing the heat-transfer portions 501, such portions of the coil 201 and the inner core portion 202 become close to the inner wall surface, and hence the heat can be likely radiated from the portions.

Each heat-transfer portion 501 has a rectangular-plate-like shape in which a corner portion that is in contact with the inner core portion 202 is cut, and the rectangular plate is placed on the bottom surface 301 of the case 103. The heat-transfer portion 501 may have the shape of a rectangular plate or other shape. The upper surface of the heat-transfer portion 501 is also in contact with part of the lower end surface of the coil 201 in this example, and hence can make a contribution to dissipating the heat of the coil 201. However, the upper surface of the heat-transfer portion 501 may be separated from the lower end surface of the coil 201. Even in this case, the heat-transfer portion 501 is close to the lower end surface of the coil 201, and hence the heat from the coil 201 can be likely dissipated. Further, since the heat-transfer portion 501 is continued to the bottom surface 301 of the case 103, the heat is easily transferred from the coil 201 and the inner core portion 202 to the bottom surface 301.

A heat-transfer portion like the heat-transfer portion 501 may be provided at the upper surface side of the reactor 101 instead of the heat-transfer portion 501 or in addition to the heat-transfer portion 501. Further, columnar heat-transfer portions each having a cross-sectional shape similar to that of the heat-transfer portion 501 and extending in the axial direction 205 of the coil 201 may be provided. In this case, the heat-radiation performance of a portion that is far from the side walls of the case 103 can be efficiently increased. The area between these heat-transfer portions is filled with the mixture of the magnetic material and the resin forming the outer core portion 203, and hence the magnetic circuit is ensured in the outer core portion 203.

Figure 6:
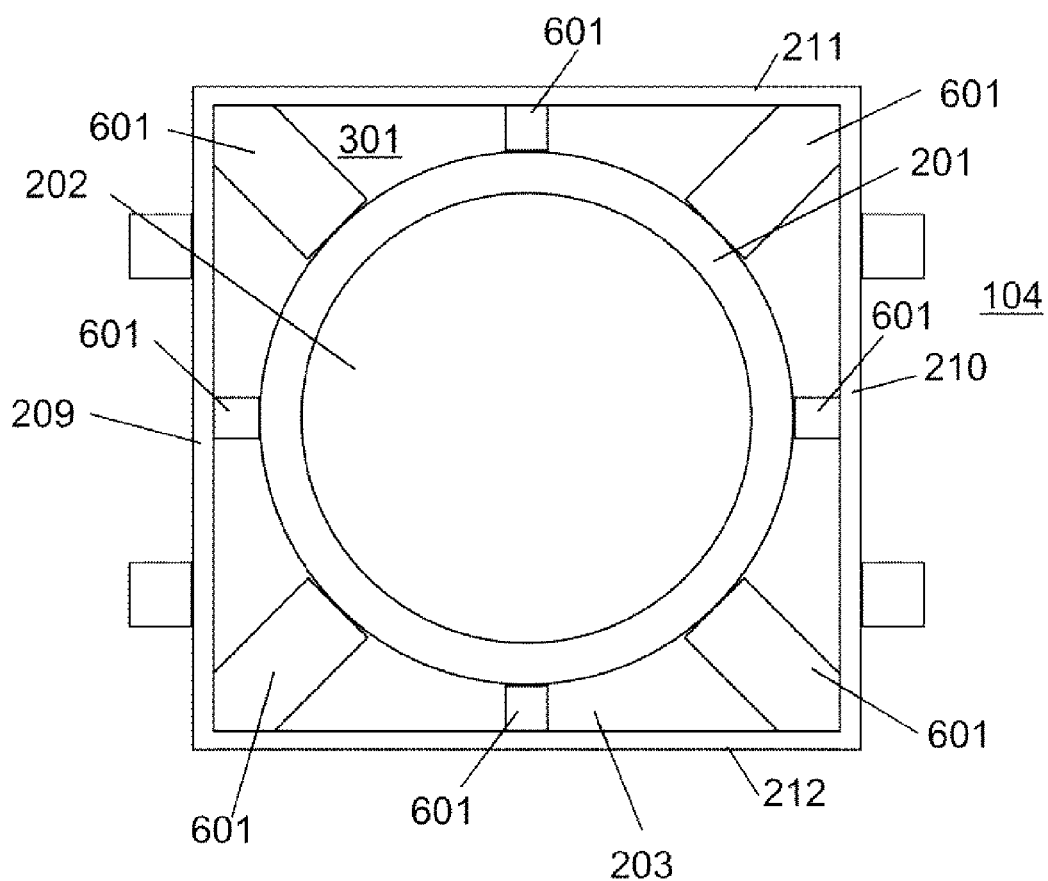
FIG. 6 is an illustration explaining a reactor including heat-transfer portions in which a plurality of radially arranged plate-like portions are arrayed, as a heat-transfer portion according to yet another example.

FIG. 6 is an illustration explaining a reactor including heat-transfer portions in which a plurality of radially arranged plate-like portions are arrayed, as a heat-transfer portion according to yet another example. Heat-transfer portions 601 are formed by radially arranging a plurality of plate-like portions standing on the bottom surface 301 of the case 103 along the axial direction of the coil 201, around the inner core portion 202. In this example, the plate-like portion provided at each of the four inner corners has a larger thickness than that of the plate-like portion provided at the center of each of the side walls. The plate-like portions may have the same thickness, and the number of plate-like portions is not limited to this example.

A surface of each heat-transfer portion 601 is in contact with the coil 201. Accordingly, the heat of the outer peripheral surface of the coil 201 can be easily dissipated to the side walls 209 to 212 of the case 103 and then to the bottom surface 301. The heat-transfer portion 601 does not have to be in contact with the coil 201. Further, the radially arranged heat-transfer portions 601 may be close to or may be in contact with the coil 201 and the inner core portion 202. The outer core portion 203 is formed between the plate-shape portions and the magnetic circuit can be ensured widely at that portion.

Figure 7A:
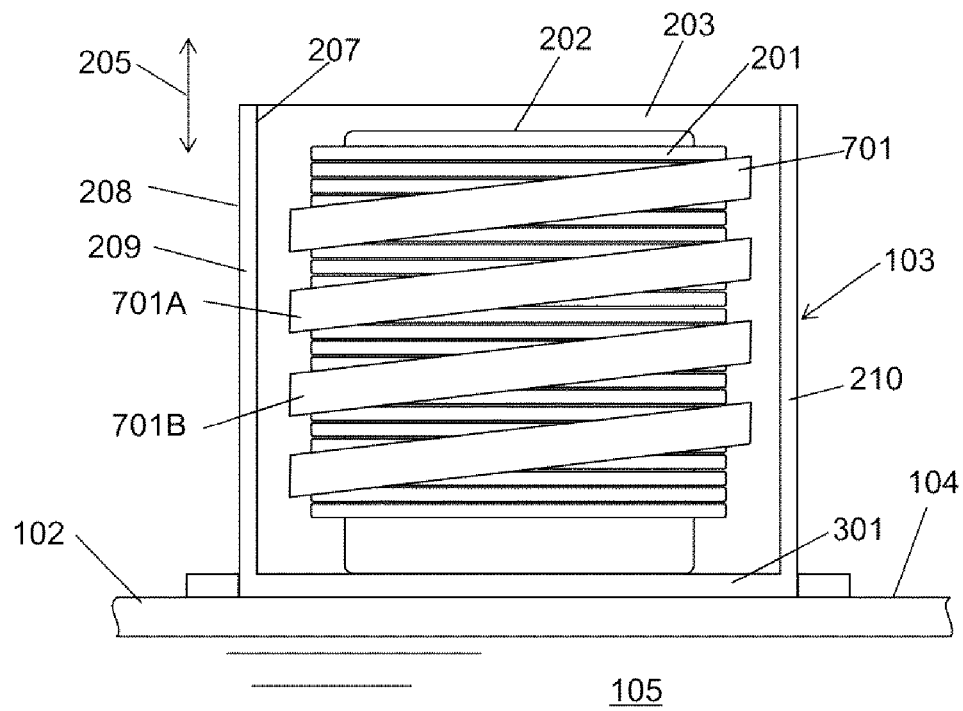
FIG. 7A is an illustration explaining a reactor including spiral heat-transfer portions as a heat-transfer portion according to a further example. More particularly.
Figure 7B:
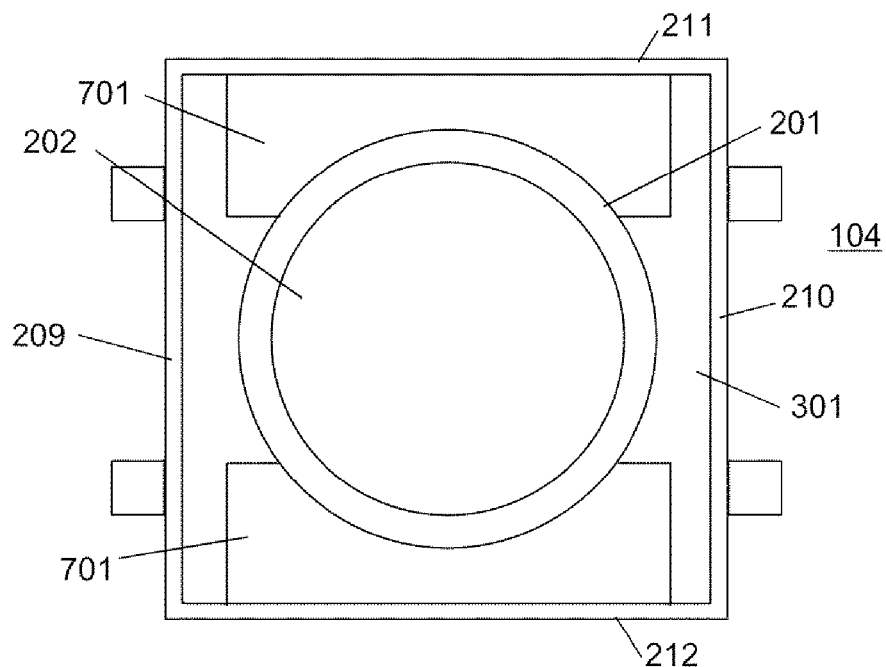
FIG. 7B is an illustration explaining the reactor including the spiral heat-transfer portions as the heat-transfer portion according to the further example. More particularly.

FIGS. 7A and 7B are illustrations explaining a reactor including spiral heat-transfer portions, as a heat-transfer portion according to a further example. Heat-transfer portions 701 are provided at the side walls 211 and 212 of the case 103. The two heat-transfer portions 701 are formed around the coil 201 in spiral forms. The heat-transfer portions 701 are in contact with the coil 201 (and the inner core portion 202) or are close to the coil 201 (and the inner core portion 202), thereby easily dissipating the heat. A gap is provided between line portions (for example, 701A and 701B) that form spirals. The outer core portion 203 is formed also in the gap, and hence the magnetic circuit can be formed even in that portion. By forming the heat-transfer portions 701 in spiral forms, the spiral forms allow the heat of the coil 201 to be relatively uniformly radiated and make a contribution to forming the magnetic circuit.

Figure 8A:
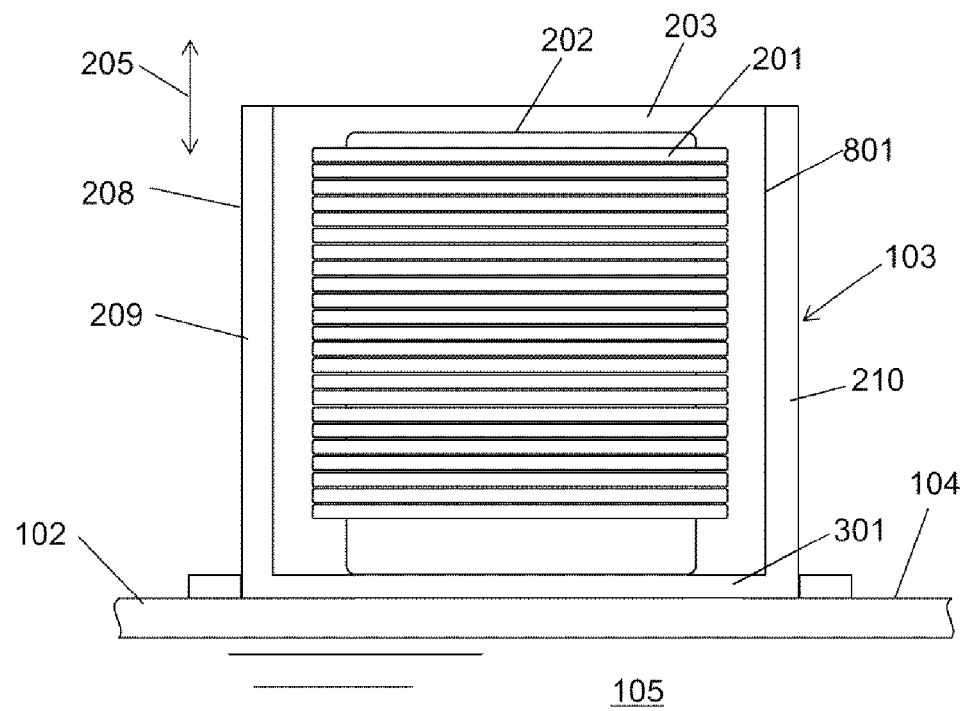
FIG. 8A is an illustration explaining the configuration of a reactor having a case with an inner wall surface formed to correspond to the external shapes of a coil and an inner core portion, as a heat-radiation structure of a case according to another example. More particularly.
Figure 8B:
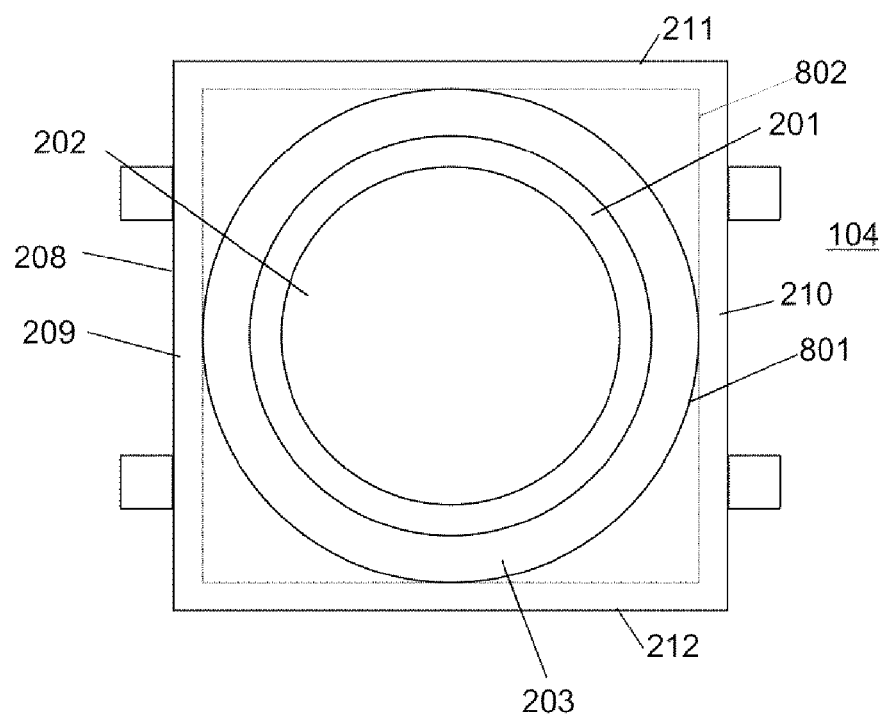
FIG. 8B is an illustration explaining the configuration of the reactor having the case with the inner wall surface formed to correspond to the external shapes of the coil and the inner core portion, as the heat-radiation structure of the case according to another example. More particularly.

FIGS. 8A and 8B are illustrations explaining the configuration of a reactor including a case having an inner wall surface that is formed to correspond to the external shapes of the coil and the inner core portion, as a heat-radiation structure of a case according to another example. The heat-radiation structure according to this example is formed of an inner wall surface 801 that is formed in a columnar shape to correspond to the external shapes of the coil 201 and the inner core portion 202. Since the external shape of the case 103 is a rectangular-parallelepiped, the outer wall surface 208 is non-similar to the inner wall surface 801. An imaginary line 802 imaginarily indicates an inner wall surface if the inner wall surface is formed in a shape of a rectangular-parallelepiped that is similar to the outer wall surface 208. As it is found through comparison between the inner wall surface 801 and the imaginary line 802 in the figure, since the columnar inner wall surface 801 is formed to correspond to the external shapes of the coil 201 and the inner core portion 202, the side wall of the case 103 is close to the coil 201 and the inner core portion 202. Also, since the inner wall surface 801 is formed in this way, the outer core portion 203 is formed in a cylindrical shape to fill the gap in accordance with the shape of the inner wall surface 801. The thickness of the outer core portion 203 is uniformly decreased entirely in the circumferential direction of the cylindrical coil 201. Accordingly, the heat can be easily uniformly dissipated from the coil 201 and the inner core portion 202 to the bottom surface 301 of the case 103.

Also, since the outer core portion 203 is formed in a cylindrical shape, variation in magnetic-circuit length can be reduced entirely in the circumferential direction of the coil 201. As the result, a designed magnetic characteristic can be more easily obtained. Further, an excessive core member of the outer core portion 203 can be reduced. It is to be noted that the example in which the coil 201 is cylindrical has been described; however, the shape of the coil 201 may be other shape.

Figure 9A:
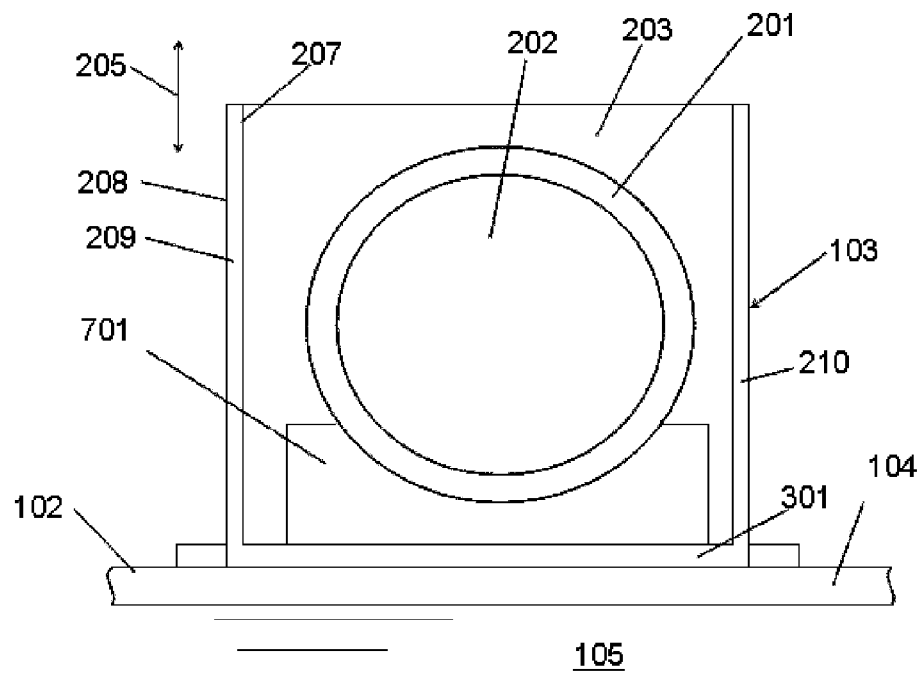
FIG. 9A is an illustration explaining the configuration of a reactor including a case having heat-transfer portions formed to correspond to the external shapes of a coil and an inner core portion arranged in substantially parallel to a bottom surface of a case, as the heat-radiation structure of a case according to still another example. More particularly.
Figure 9B:
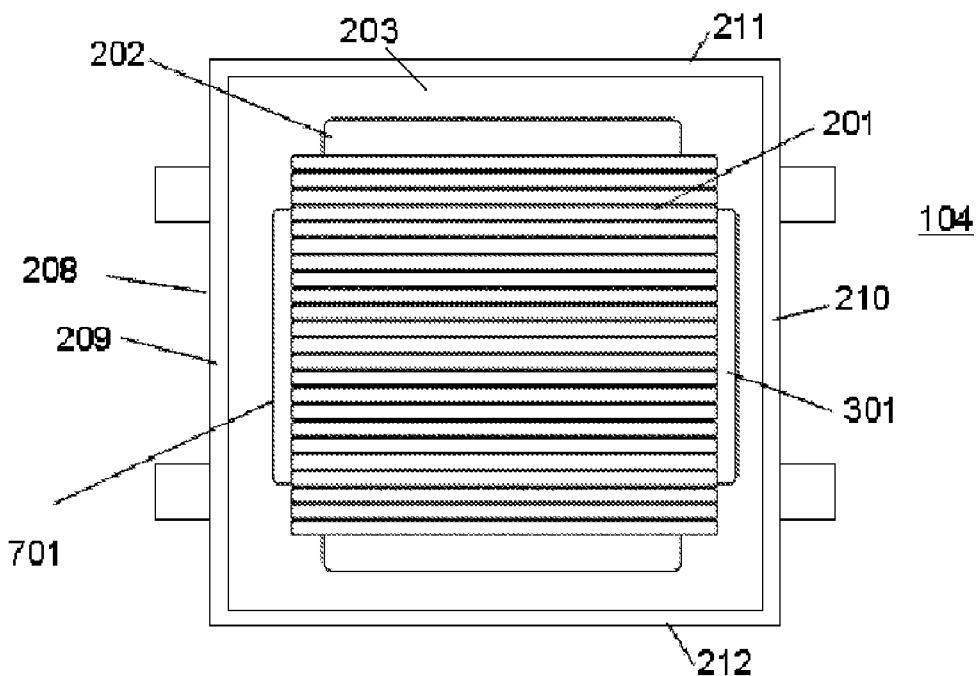
FIG. 9B is an illustration explaining the configuration of the reactor including the case having the heat-transfer portions formed to correspond to the external shapes of the coil and the inner core portion arranged in substantially parallel to the bottom surface of the case, as the heat-radiation structure of the case according to still another example. More particularly.

FIGS. 9A and 9B are illustrations explaining a configuration of a reactor in which a coil is arranged in substantially parallel to the bottom surface of the case, as a heat-radiation structure of a case according to still another example, is described below. The heat-radiation structure according to this example includes the coil 201, the inner core portion 202, and a heat-transfer portion 701. If the heat-transfer portion 701 is formed in this way, the outer core portion 203 is formed to fill a gap in accordance with the shape. Also, since the coil 201, the inner core portion 202, and the heat-transfer portion 701 are formed, the bottom surface of the case 103 is further close to the coil 201 and the inner core portion 202, and hence the heat can be easily dissipated from the coil 201 and the inner core portion 202 to the bottom surface 301 of the case 103 through the heat-transfer portion 701.

It is to be noted that the example in which the coil 201 is cylindrical and has the circular end surface has been described; however, the end surface shape of the coil 201 may be other shape, such as a rectangle, an ellipsoid, or a racetrack-like shape.

Figure 10A:
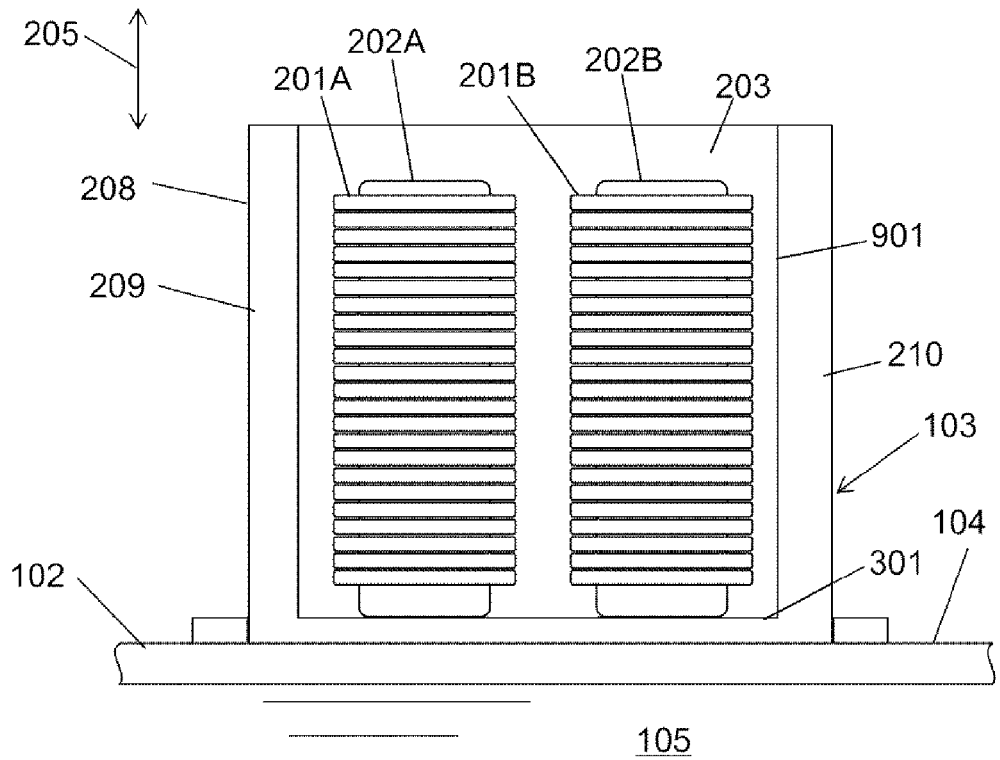
FIG. 10A is an illustration explaining the configuration of a reactor having a case with an inner wall surface formed to correspond to the external shapes of a plurality of coil elements, as a heat-radiation structure of a case according to yet another example. More particularly.
Figure 10B:
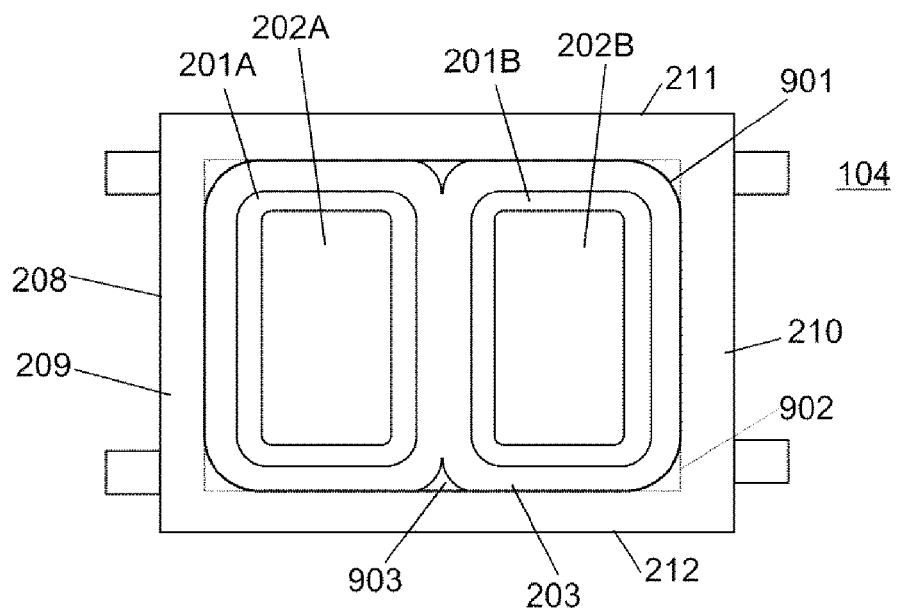
FIG. 10B is an illustration explaining the configuration of the reactor having the case with the inner wall surface formed to correspond to the external shapes of the plurality of coil elements, as the heat-radiation structure of the case according to yet another example. More particularly.

FIGS. 10A and 10B are illustrations explaining the configuration of a reactor including a case having an inner wall surface that is formed to correspond to the external shapes of a plurality of coil elements, as a heat-radiation structure of a case according to yet another example. In this example, a coil includes two coil elements 201A and 201B. Inner core portions 202A and 202B are respectively prepared for the coil elements 201A and 201B. The coil elements 201A and 201B each have an end surface of a rectangular shape (track-like shape) the corners of which are rounded.

An inner wall surface 901 of the case 103 is formed to have a track-like cross-sectional shape to correspond to an envelope that connects the external shapes of the two coil elements 201A and 201B. The outer peripheral surface of the coil element 201A or 201B is parallel to the inner wall surface 901 even at the rounded corner portion of the track-like shape. Since the external shape of the case 103 is a rectangular-parallelepiped, the outer wall surface 208 is non-similar to the inner wall surface 901. The ratio of the long side to the short side of the rectangle serving as a base of the track-like shape is different from that of the rectangle of the cross section of the case 103, and hence the outer wall surface 208 is non-similar to the inner wall surface 901 also in this point of view. An imaginary line 902 imaginarily indicates an inner wall surface if the inner wall surface is formed in a shape of a rectangular-parallelepiped that is similar to the outer wall surface 208. Similarly to the example of FIGS. 8A and 8B, as it is found through comparison between the inner wall surface 901 and the imaginary line 902 in the figure, since the inner wall surface 901 having the track-like cross section is formed to correspond to the external shapes of the coil elements 201A and 201B, the side walls of the case 103 are close to the coil elements 201A and 201B. Accordingly, the heat can be easily dissipated from both the coil elements 201A and 201B to the bottom surface 301 of the case 103. If the plurality of coil elements are provided as described above, the inner wall surface 901 can be formed to correspond to the envelope that connects the external shapes of the coil elements.

Even if the plurality of coil elements are provided, an inner wall surface may be formed to correspond to each of the external shapes of the coil elements. For example, if an inner wall surface 903 shown in FIG. 10B is added, an inner wall surface is formed to correspond to the external shape of the coil element 201A or 201B. In this case, a section in which the coil elements 201A and 201B are parallel to the inner wall surface is provided in a portion between the coil elements 201A and 201B. Accordingly, the heat can be further effectively dissipated from the coil elements 201A and 201B.

Figure 11:
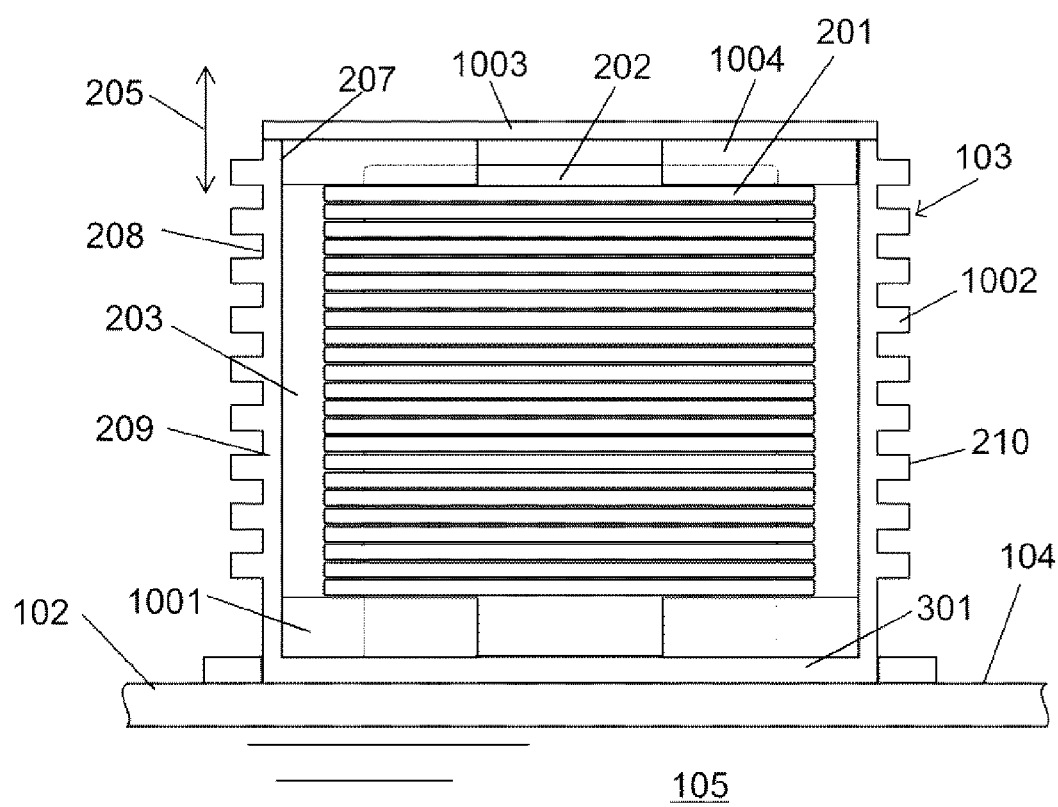
FIG. 11 is an illustration explaining the configuration of a reactor including a case having an outer wall with a heat-radiation structure and a lid.

FIG. 11 is an illustration explaining the configuration of a reactor including a case having an outer wall with a heat-radiation structure and a lid. Heat-transfer portions 1001 are provided at positions corresponding to four inner corners at the bottom surface 301 side of the case 103 like the example shown in FIGS. 5A and 5B. The heat-transfer portions 1001 are an example for explaining the configuration of FIG. 11, and the configuration is not limited to the heat-transfer portions 1001.

In the reactor of FIG. 11, the outer wall surface 208 at the side walls of the case 103 also has heat-radiation structures 1002. The heat-radiation structures 1002 each have a structure in which a plurality of plate-like pieces arranged in parallel to the bottom surface of the case 103 are arrayed on the outer wall surface 208 of the side walls of the case 103 in the axial direction of the coil 201. However, the heat-radiation structure of the outer wall surface 208 is not limited to this example. For example, the heat-radiation structure may be formed of a plurality of needle-like protrusions arranged entirely on the outer wall surface of the side walls.

By providing the heat-radiation structures 1002 at the outer wall surface 208 of the case 103 as described above, the heat transferred from the coil 201 and the inner core portion 202 to the side walls of the case 103 can be further effectively dissipated. Accordingly, the heat-radiation performance of the entire reactor can be increased.

Further, in this example, the case 103 has a lid 1003 that closes an upper portion of the case 103. In the above-described examples, the upper surface of the case 103 is open and part of the outer core portion 203 is exposed. In the example of FIG. 11, the upper side of the case 103 is closed with the lid 1003 that is, for example, made of aluminum. The upper surface of the reactor is in surface-contact with the lid 1003. Accordingly, the heat of the upper surface of the reactor is also dissipated through a path extending to the bottom surface 301 through the lid 1003 and the side walls of the case 103. The material of the lid 1003 may use a metal material such as aluminum or an aluminum alloy, or a ceramic such as silicon nitride, alumina, aluminum nitride, boron nitride, or silicon carbide. Also, if the lid 1003 and the case 103 are made of a conductive material like a metal material, the lid 1003 and the case 103 also function as shields for electromagnetic interference.

Further, in this example, heat-transfer portions 1004 are provided at positions corresponding to four corners at the upper surface side of the case 103. The heat-transfer portions 1004 are in contact with a side surface of an upper portion of the inner core portion 202 protruding from the coil 201, and are in contact with part of an upper end surface of the coil 201. Further, the heat-transfer portions 1004 are also in contact with the lid 1003 when the lid 1003 is closed. Accordingly, the heat can be further effectively dissipated from the coil 201 and the inner core portion 202 through the heat-transfer portions 1004 and the lid 1003. It is to be noted that the heat-transfer portions 1004 may not be provided at the case 103 and may be provided at the lid 1003. In this case, the outer core portion 203 is molded in a shape that does not interfere with the heat-transfer portions of the lid 1003. Accordingly, the heat can be further effectively transferred from the coil 201 and the inner core portion 202 to the lid 1003.

The above-described embodiment does not limit the technical scope of the present invention, and various modifications and applications can be made within the scope of the present invention. For example, the application of the reactor of the present invention is not limited to the vehicle-mounted converter, and the reactor can be applied to a power converter with a relatively high output, such as a converter for an air conditioner. Further, the reactor housed in the case may be manufactured also by preparing an assembled part of a coil and a core, housing the assembled part, and filling a separately prepared potting resin. The potting resin may use, for example, a mixture containing epoxy resin, urethane resin, PPS resin, polybutylene terephthalate (PBT) resin, or acrylonitrile butadiene styrene (ABS) resin; and also a filler made of at least one type of ceramics including silicon nitride, alumina, aluminum nitride, boron nitride, and silicon carbide.

By containing the filler, the heat-radiation performance of the reactor is increased. Further, the present invention can be applied not only to the reactor housed in the case such that the axial direction of the coil is parallel to the normal direction of the bottom surface of the case, but also to, for example, a reactor housed in a case such that the axial direction of a coil is parallel to the bottom surface of the case.

In the above-described embodiment, the present invention has been described as the reactor the inner core portion of which is formed of the powder compact. For another example, the inner core portion may use a configuration formed of a stack in which electromagnetic steel sheets, which are typically silicon steel sheets, are stacked. The electromagnetic steel sheets more likely provide a magnetic core with a high saturation magnetic flux density than the powder compact does. Further, in the above-described reactor, the inner core portion has the higher saturation magnetic flux density than that of the outer core portion, and the outer core portion has the lower permeability than that of the inner core portion. However, the reactor to which the present invention is applied is not limited thereto. For example, not only the outer core portion but also the inner core portion may be formed of a mixture of a magnetic material and a resin.

The embodiment and the examples disclosed herein are mere examples and do not intend to provide limitation. The scope of the present invention is not defined by the above description but is defined by the scope of the claims. It is intended that the scope of the present invention contains the meanings equivalent to the scope of the claims and all modifications within the scope of the claims.

Industrial Applicability

The reactor according to the present invention can be used for a component of a power converter, for example, a converter mounted on a vehicle, such as a hybrid electric vehicle, a plug-in hybrid electric vehicle, an electric vehicle, or a fuel cell vehicle, or a converter mounted on an air conditioner.

Reference Signs List
- 101 reactor
- 102 converter case
- 103 case of reactor
- 201 coil
- 201A, 201B coil element
- 201w wire
- 202 inner core portion
- 203 outer core portion
- 204 core
- 206, 401, 501, 601, 701, 1001, 1004 heat-transfer portion
- 206A, 206B protrusion
- 207, 801, 901 inner wall surface
- 208 outer wall surface
- 209, 210, 211, 212 side wall
- 301 bottom surface of case
- 1002 heat-radiation structure of outer wall
- 1003 lid of case

The invention claimed is:

1. A reactor comprising: a coil; a core having an inner core portion arranged inside the coil and an outer core portion covering the outside of the coil; and a case housing the coil and the core,
    wherein the case has a heat-radiation structure at an inner wall surface, the heat-radiation structure being provided for at least one of the coil and the inner core portion,
    wherein the heat-radiation structure is non-similar to an outer wall surface of the case, and is formed of the inner wall surface that is formed to correspond to an external shape of the at least one of the coil and the inner core portion.

2. The reactor according to claim 1, wherein the heat-radiation structure has a heat-transfer portion provided such that part of the inner wall surface of the case protrudes.

3. The reactor according to claim 1, wherein at least the outer core portion of the core is formed of a mixture of a magnetic material and a resin.

4. The reactor according to claim 1, wherein the coil is arranged such that an axial direction of the coil is in substantially parallel to a bottom surface of the case.

5. The reactor according to claim 1, wherein the inner core portion has a higher saturation magnetic flux density than that of the outer core portion.

\* \* \* \* \*

UNITED STATES PATENT AND TRADEMARK OFFICE
CERTIFICATE OF CORRECTION

PATENT NO. : 8,525,629 B2  
APPLICATION NO. : 13/522175  
DATED : September 3, 2013  
INVENTOR(S) : Inaba et al.

Page 1 of 1

It is certified that error appears in the above-identified patent and that said Letters Patent is hereby corrected as shown below:

Title Page, Item (73) Assignee should read: Sumitomo Electric Industries, Ltd., ~~Osaka-Shi~~ Osaka-shi (JP)

Item (86) should read: § 371(c)(1), (2), and (4) Date: ~~Jan. 8, 2011~~ July 13, 2012

Signed and Sealed this  
Third Day of December, 2013

Margaret A. Focarino  
*Commissioner for Patents of the United States Patent and Trademark Office*